United States Patent
Sunkara

(10) Patent No.: US 8,288,324 B2
(45) Date of Patent: Oct. 16, 2012

(54) WELLBORE FLUIDS COMPRISING POLY(TRIMETHYLENE ETHER) GLYCOL POLYMERS

(75) Inventor: Hari Babu Sunkara, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 8 days.

(21) Appl. No.: 13/075,447

(22) Filed: Mar. 30, 2011

(65) Prior Publication Data

US 2011/0177981 A1 Jul. 21, 2011

Related U.S. Application Data

(62) Division of application No. 12/023,355, filed on Jan. 31, 2008, now abandoned.

(51) Int. Cl.
*C09K 8/24* (2006.01)
*C09K 8/28* (2006.01)
(52) U.S. Cl. ........ 507/136; 507/117; 507/131; 507/133; 507/269; 175/65
(58) Field of Classification Search .................. None
See application file for complete search history.

(56) References Cited

U.S. PATENT DOCUMENTS

| | | | |
|---|---|---|---|
| 4,254,105 | A | 3/1981 | Fukuda |
| 5,633,362 | A | 5/1997 | Nagarajan et al. |
| 5,686,276 | A | 11/1997 | Laffend et al. |
| 5,821,092 | A | 10/1998 | Nagarajan et al. |
| 6,583,302 | B1 | 6/2003 | Erhan et al. |
| 7,038,092 | B2 | 5/2006 | Sunkara et al. |
| 7,084,311 | B2 | 8/2006 | Sunkara et al. |
| 7,098,368 | B2 | 8/2006 | Seapan et al. |
| 7,161,045 | B1 | 1/2007 | Sunkara et al. |
| 7,164,046 | B1 | 1/2007 | Sunkara et al. |
| 2003/0130133 | A1 | 7/2003 | Vollmer et al. |
| 2004/0030095 | A1 | 2/2004 | Sunkara et al. |
| 2005/0020805 | A1 | 1/2005 | Sunkara et al. |
| 2005/0069997 | A1 | 3/2005 | Adkesson et al. |
| 2005/0113264 | A1 | 5/2005 | Vollmer et al. |
| 2007/0259791 | A1 | 11/2007 | Wang et al. |
| 2008/0242830 | A1 | 10/2008 | Niu et al. |

FOREIGN PATENT DOCUMENTS

WO 2007/088322 A1 8/2007

OTHER PUBLICATIONS

U.S. Appl. No. 11/593,954, filed Nov. 7, 2006, Sunkara et al.
C. Norr et al., Modification of the Zahn-Wellens Test: Determination of the Biodegradability of Poorly Soluble, Absorbing and Volatile Substances by Measurement of Oxygen Consumption and Carbon Dioxide Production, Chemosphere, Aug. 2001, pp. 553-559, vol. 44, Issue 4.
Yuch-Ping Hsieh, Pool Size and Mean Age of Stable Soil Organic Carbon in Cropland, Soil Science Society of America Journal, 1992, pp. 460-464, vol. 56(2).
I. Malchev, Plant-Oil-Based Lubricants, Available From the Department of Plant Agriculture, Ontario Agriculture College, University of Guelph, 50 Stone Road W., Guelph, Ontario, Canada, N1G 2W1.
Currie, Source Apportionment of Atmospheric Particles, Characterization of Environmental Particles, IUPAC Environmental Analytical Chemistry Series, 1992, pp. 3-74, vol. 1.
Hoffman et al., Heat-Induced Aggregation of B-Lactoglobulin: Role of the Free Thiol Group and Disulfide Bonds, J. Agric. Food Chem., 1997, pp. 2942-2948, vol. 45.
International Search Report, PCT International Application No. PCT/US2009/032312, Mailed Mar. 28, 2011.

*Primary Examiner* — John J Figueroa

(57) ABSTRACT

Wellbore fluids containing poly(trimethylene ether)glycols are provided. The wellbore fluids can provide enhanced functionality, improved cost effectiveness, and reduced environmental impact as compared to conventional wellbore fluids.

11 Claims, No Drawings

WELLBORE FLUIDS COMPRISING POLY(TRIMETHYLENE ETHER) GLYCOL POLYMERS

This divisional application claims priority under 35 U.S.C. §119 from U.S. National application Ser. No. 12/023,355 filed on Jan. 31, 2008 and published on Aug. 6, 2009 as US Patent Application Publication No. 2009/0197781.

FIELD OF THE INVENTION

The present invention relates to wellbore fluids containing poly(trimethylene ether)glycol polymers and their derivatives, and to methods of using the wellbore fluids in connection with drilling operations.

BACKGROUND

Oil can be recovered from oil-bearing reservoirs by a number of well-known drilling methods. Wellbore fluids, also known as drilling fluids, are employed in these methods, and are generally circulated down the hole being drilled and around the drill bit. Wellbore fluids are used in the construction, repair and treatment of wellbores.

The fluids serve many purposes, including cooling and lubricating the drill bit and carrying drilling cuttings away from the bit. Additionally, the wellbore fluids can contain materials that control the viscosity of the fluid, provide for good heat transfer and lubricity, and allow for optimal environmental performance. They can also include materials that help to prevent fluid loss into the geological formations through which the drill bit passes.

PCT Publication WO 2007/088322 discloses wellbore fluids comprising a base fluid and a particulate bridging agent.

Wellbore fluids that are environmentally benign, cost-effective and have enhanced functionality are desired.

SUMMARY OF THE INVENTION

One aspect of the present invention is a method of preparing a wellbore fluid comprising by adding to a base fluid: (a) one or more polymers having a number average molecular weight from about 250 to 3000, selected from the group consisting of poly(trimethylene ether)glycol homopolymer, and poly(trimethylene ether)glycol esters; and (b) at least one additive selected from the group consisting of surfactants, fluid loss control additives, salts, and acid gas scavengers; wherein the amount of the base fluid in the wellbore fluid is at least about 50 weight percent based on the total weight of the wellbore fluid.

Another aspect of the present invention is a method of using an oil-in-water emulsion or a water-in-oil emulsion wellbore fluid in a subterranean formation comprising: providing a wellbore fluid comprising (a) a base fluid; (b) one or more polymers selected from the group consisting of poly(trimethylene ether)glycol homopolymer, and poly(trimethylene ether) glycol esters; and (c) at least one additive selected from the group consisting of surfactants, fluid loss control additives, salts, and acid gas scavengers; and using the wellbore fluid to drill a well bore in the subterranean formation.

In some embodiments, the polymer provides a function such as viscosity modification, lubrication, foaming, scale inhibition, or heat transfer.

DETAILED DESCRIPTION

Unless otherwise defined, all technical and scientific terms used herein have the same meaning as commonly understood by one of ordinary skill in the art to which this invention belongs. In case of conflict, the present specification, including definitions, will control.

The present invention relates to wellbore or drilling fluids containing poly(trimethylene ether)glycol polymers. The polymers are not only environmentally friendly but also possess a unique combination of properties that can enhance the efficiency of the wellbore fluids. Depending upon the application and/or additives used, the wellbore fluids can function to varying degrees as viscosifiers, lubricants, foamers, scale inhibitors, and heat transfer agents.

The term "wellbore fluid" as used herein encompasses drilling fluids, lost circulation fluids, completion fluids (e.g., perforating pills and under-reaming fluids) and servicing fluids (e.g., workover fluids, milling fluids, fracturing fluids, solvents, aqueous fluids containing non-acidic dissolving agents, and fluids containing particulate diverting agents). The wellbore fluids disclosed herein are suitable for use in a variety of wellbores including oil and/or gas producing wellbores, water or gas injection wellbores, water producing wellbores and geothermal wellbores. The wellbore fluids are used in a subterranean formation in connection with drilling operations. The subterranean formation commonly comprises shale.

One embodiment of the present invention is a method of using a wellbore fluid. The fluid is used in a subterranean formation. The subterranean formation commonly comprises shale. The method includes: providing a wellbore fluid comprising (a) a base fluid (b) one or more renewably sourced polymers selected from the group consisting of poly(trimethylene ether)glycol homopolymer, poly(trimethylene ether) glycol copolymers and poly(trimethylene ether)glycol esters; and (c) at least one additive selected from the group consisting of surfactants, fluid loss control additives, salts, and acid gas scavengers; and using the wellbore fluid to drill a well bore in the subterranean formation.

Also provided in an embodiment of the invention is a method of drilling a well in a subterranean formation comprising: providing a wellbore fluid comprising (a) a base fluid (b) one or more renewably sourced polymers selected from the group consisting of poly(trimethylene ether)glycol homopolymer, poly(trimethylene ether)glycol copolymers and poly(trimethylene ether)glycol esters; and (c) at least one additive selected from the group consisting of surfactants, fluid loss control additives, salts, and acid gas scavengers; and placing the wellbore fluid within a well bore in contact with a drill bit and the subterranean formation.

The wellbore fluids comprise one or more poly(trimethylene ether) glycols (including homopolymer, copolymers thereof and esters thereof). The poly(trimethylene ether)glycols are preferably environmentally friendly, inherently biodegradable, non-hazardous to animals and plants, and renewably sourced. Biodegradability can be tested via a Zahn-Wellens test, which enables a continuous and parallel determination of oxygen consumption (pressure measurement) and carbon dioxide production (conductivity measurement). It is a closed test system consisting of a culture flask, a carbon dioxide absorption flask, a pump and integrated measuring and control instruments. The air circulating within the test system causes the carbon dioxide present in the test solution to be stripped out completely and directly absorbed by the absorption solution. The process is disclosed in, for example, C. Norr, et al., *Chemosphere* 2001 August; 44(4): 553-9.

Animal and plant toxicity is generally tested by determining either the $LC_{50}$ (the concentration of agonist which is lethal to 50 percent of the tested animal population) or the EC$_{50}$ (the concentration of agonist with shows the expected effect to 50 percent of the tested plant or non-animal population). Many different testing protocols are available. Commonly-used protocols include those listed by the Organisation for Economic Co-operation and Development (OECD), including OECD TG 203 for acute/prolonged toxicity to fish, OECD TG 202 for acute toxicity to aquatic invertebrates, and OECD TG 201 for toxicity to aquatic plants.

Additionally, the poly(trimethylene ether)glycols disclosed herein generally have relatively low flammability, and relatively high flash and fire points and are thermally, chemically and oxidatively stable. In addition they have relatively low pour points and viscosity, which allow the polymers to be useful both at low and high operating temperatures. The wellbore fluids disclosed herein generally require less energy to produce, and therefore produce lower amounts of greenhouse gases than conventional wellbore fluids.

Base Fluid

The wellbore fluids disclosed herein contain a base fluid, which can be water- or oil-based, or an oil-in-water or water-in-oil emulsion. In preferred embodiments, the wellbore fluid contains the base fluid in an amount of about 50 wt % or greater, based on the total combined weight of the wellbore fluid and all additives. In various embodiments, the wellbore fluid can contain the base fluid in an amount of about 75 wt % or greater, or about 90 wt % or greater, or about 95 wt % or greater, based on the total combined weight of the wellbore fluid including all additives. Whether water- or oil-based, or emulsion, the wellbore fluid generally contains one or more antioxidants.

In embodiments wherein the base fluid is water-based, the fluid is predominantly (i.e., greater than 50% by weight) water. The water-based base fluid further contains at least one additive, which are generally water-miscible. In some embodiments, the additives comprise copolyether glycols, particularly copolymers comprising poly(trimethylene ether) glycol. Generally for adequate dispersibility, the molecular weight for the copolyether glycols is in the range of about 250 to 1000.

In alternate embodiments, the wellbore fluids contain an oil-based base fluid and at least one additive. The oil based fluids are of two types: an oil based fluid containing little if any water, or a water-in-oil emulsion containing as much as 50% water in the internal phase. In general, the oil is selected from mineral oils, synthetic oils, esters, kerosene and diesel. The poly(trimethylene ether)glycol polymers can be used as the base fluid, alone or in combination with other compatible oils. The oil-based based fluid contains one or more poly(trimethylene ether)glycols selected from: homopolymers of poly(trimethylene ether)glycol, copolymers containing poly(trimethylene ether)glycol, and esters comprising poly(trimethylene ether)glycols. In oil-based fluids, in addition to the poly(trimethylene ether) glycols, natural fluid co-lubricants including vegetable oil-based materials, can be used. Typically, the co-lubricants are liquid at room temperature. Examples of natural fluid co-lubricants include vegetable oil-based lubricants, which can be derived from plants and are generally composed of triglycerides. Although many different parts of plants may yield oil, oils suitable for use as fluid co-lubricants are extracted primarily from the seeds of oilseed plants. Such oils include, for example, both edible and inedible oils, and include, for example, high oleic sunflower oil, rapeseed oil, soybean oil, and castor oil, as well as modified oils such as disclosed in U.S. Pat. No. 6,583,302 (fatty acid esters) and I. Malchev, "Plant-Oil-Based Lubricants" (available from the Department of Plant Agriculture, Ontario Agriculture College, University of Guelph, 50 Stone Road W., Guelph, Ontario, Canada N1G 2W1). Synthetic fluid co-lubricants include lubricating oils such as hydrocarbon oils such as polybutylenes, polypropylenes, propylene-isobutylene copolymers; polyoxyalkylene glycol polymers and their derivatives such as ethylene oxide and propylene oxide copolymers; and esters of dicarboxylic acids with a variety of alcohols such as dibutyl adipate, di(2-ethylhexyl) sebacate, di-hexyl fumarate, dioctyl sebacate, diisoctyl azelate, diisodecyl azelate, dioctyl phthalate, didecyl phthalate, and the 2-ethylhexyl diester of linoleic acid dimer.

Alternatively the wellbore fluids can contain, as base fluid, water-in-oil emulsions, so that the base fluid is generally oil-based, but the additives are water-based and dispersed in the oil-based material to form an emulsion. In the case of water-in-oil emulsions, the water phase is the internal (dispersed) phase, and the oil phase water is the external (continuous, or carrier) phase.

Whether oil-based, water-based, or emulsion the base fluid contains one or more poly(trimethylene ether)glycols selected from: homopolymers of poly(trimethylene ether) glycol, copolymers contains poly(trimethylene ether) glycol, and esters comprising poly(trimethylene ether)glycols. When the poly(trimethylene ether)glycol is a homopolymer or copolymer, it is generally of a molecular weight between about 250 and 5000.

The wellbore fluid contains at least one additive selected from the group of antioxidants, heat and light stabilizers, fillers, pigments, lube additives, foaming and defoaming agents. Preferably, these additives when added to the poly(trimethylene ether)glycol impart greater than one property to the wellbore fluid (e.g., both the lubricity and the heat transfer characteristics of the wellbore fluid will be enhanced). The poly(trimethylene ether)glycol polymers in the presence of suitable additives possess excellent lube and heat transfer properties. Another property that can be controlled by the addition of a poly(trimethylene ether)glycol homopolymer is the degree of foaming of the wellbore fluid. The foaming can be indirectly controlled by adjusting the molecular weight of the homopolymer. If it is desired to have a fluid that exhibits foaming upon use, the molecular weight of the homopolymer is generally in the range of 500 to 1900. If it is desirable to use a foaming fluid, but then reduce the amount of foaming, anti-foam agents can be added. If it is desired to have a fluid that does not foam upon use, the molecular weight of the homopolymer is generally greater than 1900. Foaming agents reduce fluid loss in the wellbore fluids whereas defoamers reduce undesirable foaming which often occurs when saline drilling fluids exit the well bore.

The wellbore fluids can also contain a variety of other additives such as density modifiers, bridging agents, fluid loss control agents, pH control agents, clay or shale hydration inhibitors, bactericides, surfactants, solid and liquid lubricants, gas-hydrate inhibitors, corrosion inhibitors, defoamers, scale inhibitors, emulsified hydrophobic liquids such as oils, acid gas-scavengers (e.g., hydrogen sulfide scavengers), thinners, demulsifiers and surfactants. Examples of water-soluble density modifiers include alkali metal halides (such as sodium chloride, sodium bromide, potassium chloride and potassium bromide), alkali metal carboxylates (such as sodium formate, potassium formate, cesium formate, sodium acetate, potassium acetate and cesium acetate), sodium carbonate, potassium carbonate, alkaline earth metal halides (such as calcium chloride and calcium bromide), and zinc halide salts. Examples of water-insoluble density modifiers (also known as weighting agents) include suspended mineral particles such as ground barites, iron oxides, ilmenite, calcite, magnesite ($MgCO_3$), dolomite, olivine, siderite, hausmannite and suspended metal particles.

Bridging agents can be made of sparingly water-soluble materials such as melamine, lithium salts and magnesium sulfite, and are dosed into the wellbore fluid at a concentration that is higher than its solubility in water at the temperature encountered downhole, thereby ensuring at least a portion of the bridging solids remain suspended in the wellbore fluid. Alternatively, the bridging agents can be protected with a hydrophobic coating. More than one material can be used as a particulate bridging agent. Generally the bridging agent is present in the wellbore fluid in an amount sufficient to create a cake that provides the desired level of fluid loss control. Typically, these amounts are in the range of about 1 to about 70 percent by weight, particularly 2 to 50 percent by weight, and even more particularly 3 to 15 percent by weight.

Water-soluble polymers can be added to an aqueous based wellbore fluid to impart viscous properties, solids-dispersion and filtration control to the fluid. These materials include cellulose derivatives such as carboxymethyl cellulose, hydroxyethylcellulose, carboxymethylhydroxyethyl cellulose, sulfoethylcellulose; starch derivatives (which may be cross-linked) including carboxymethyl starch, hydroxyethyl-starch, hydroxyproplyl starch; bacterial gums including xanthan, welan, diutan, succinoglycan, scleroglucan, dextran, pullulan; plant derived gums such as guar and locust-bean gums and their derivatives, synthetic polymers and copolymers derived from suitable monomers including acrylic acid or methacrylic acid and their hydroxylic esters (e.g., hydroxyethylmethacrylic acid), maleic anhydride or acid, sulfonated monomers such as styrenesulfonic acid and AMPS, acrylamide and substituted acrylamides, N-vinylformamide and N-vinylacetamide, N-vinylpyrrolidone, vinyl acetate, N-vinylpyridine and other cationic vinylic monomers (e.g., diallydimethylammonium chloride, DADMAC); and other water-soluble or water-swellable polymers known to those skilled in the art. If used viscosifying water-soluble polymers are present in the wellbore fluid in an amount sufficient to maintain any bridging and weighting solids in suspension and provide efficient clean out from the well of debris such as drilled cuttings, for example, 0.2 to 5 pounds of viscosifier per barrel of wellbore fluid, preferably 0.5 to 3 pounds per barrel of wellbore fluid.

Rheological control (e.g., gelling properties) can also be provided to the aqueous based wellbore fluid by adding clays and/or other inorganic fine particles. Examples include bentonite, montmorillonite, hectorite, attapulgite, sepiolite, Laponite™ clay and mixed metal hydroxides.

The particulate bridging agents often contain voids (i.e., spaces in the bridging agent matrix). A fluid loss control additive can be used to fill the voids between the particulate bridging agent. The fluid loss control additives are dissolved macromolecules that are capable of adsorbing onto the bridging solids, or macromolecules that are in colloidal dispersion in the aqueous base fluid. Besides the water-soluble polymers listed above, examples of fluid loss control additives for water-based wellbore fluids include causticised lignite, modified lignites, and cross-linked lignosulfonates.

The pH of the water-based wellbore fluid can also be controlled by adding additives. Suitable pH control agents for aqueous based wellbore fluids include calcium hydroxide, magnesium hydroxide, magnesium oxide, potassium hydroxide, and sodium hydroxide.

When the wellbore fluid is an oil based fluid, the wellbore fluid may contain additional additives for improving the performance of the wellbore fluid with respect to one or more properties. Examples of additives that may be added to oil-based wellbore fluids include viscosifiers, surfactants, fluid loss control additives, lubricants (solid and liquid), and acid gas scavengers.

A viscosifier can be added to the oil-based wellbore fluid to impart viscous properties, solids suspension and hole cleaning properties to the fluid. A commonly used type of viscosifier is a montmorillonite or hectorite clay that has been treated with fatty quaternary ammonium salts to render the clay dispersible and exfoliatable in the oil-based wellbore fluid. Oil-soluble polymers and oligomers can be used as rheological modifiers.

Suitable fluid loss control additives that can be added to the oil-based wellbore fluid include asphalt, blown asphalt, sulfonated asphalt, gilsonite, fatty amine-modified lignite, and synthetic oil-soluble/swellable polymers.

Poly(trimethylene ether glycol (PO3G) Homo and Copolymers

PO3G, as the term is used herein, is a polymeric ether glycol in which at least 50% of the repeating units are trimethylene ether units. More preferably from about 75% to 100%, still more preferably from about 90% to 100%, and even more preferably from about 99% to 100%, of the repeating units are trimethylene ether units.

PO3G is preferably prepared by polycondensation of monomers comprising 1,3-propanediol, preferably in the presence of an acid catalyst, thus resulting in polymers or copolymers containing —($CH_2CH_2CH_2O$)— linkage (e.g, trimethylene ether repeating units). As indicated above, at least 50% of the repeating units are trimethylene ether units.

In addition to the trimethylene ether units, lesser amounts of other units, such as other polyalkylene ether repeating units, may be present. In the context of this disclosure, the term "poly(trimethylene ether)glycol" encompasses PO3G made from substantially pure 1,3-propanediol, as well as those oligomers and polymers (including those described below) containing up to about 50% by weight of comonomers.

PO3G can be made via a number of processes known in the art, as disclosed in, for example, U.S. Pat. No. 7,161,045 and U.S. Pat. No. 7,164,046.

As indicated above, PO3G may contain lesser amounts of other polyalkylene ether repeating units in addition to the trimethylene ether units. The monomers for use in preparing poly(trimethylene ether)glycol can, therefore, contain up to 50% by weight (preferably about 20 wt % or less, more preferably about 10 wt % or less, and still more preferably about 2 wt % or less), of comonomer polyols in addition to the 1,3-propanediol reactant. Comonomer polyols that are suitable for use in the process for making the PO3G include aliphatic diols, for example, ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol, 2,2,3,3,4,4,5,5-octafluoro-1,6-hexanediol, and 3,3,4,4,5,5,6,6,7,7,8,8,9,9,10,10-hexadecafluoro-1,12-dodecanediol; cycloaliphatic diols, for example, 1,4-cyclohexanediol, 1,4-cyclohexanedimethanol and isosorbide; and polyhydroxy compounds, for example, glycerol, trimethylolpropane, and pentaerythritol. A preferred group of comonomer diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, $C_6$-$C_{10}$ diols (such as 1,6-hexanediol, 1,8-octanediol and 1,10-decanediol) and isosorbide, and mixtures thereof. A particularly preferred diol other than 1,3-propanediol is ethylene glycol, and $C_6$-$C_{10}$ diols can be particularly useful as well.

One preferred PO3G that contains comonomer is poly (trimethylene-ethylene ether)glycol such as described in US20040030095A1. Preferred poly(trimethylene-ethylene ether)glycols are prepared by acid catalyzed polycondensation of from 50 to about 99 mole % (preferably from about 60 to about 98 mole %, and more preferably from about 70 to about 98 mole %) 1,3-propanediol and up to 50 to about 1 mole % (preferably from about 40 to about 2 mole %, and more preferably from about 30 to about 2 mole %) ethylene glycol.

Poly(trimethylene ether)glycol esters

The poly(trimethylene ether)glycol esters that can be used in the wellbore fluid comprise one or more compounds of the formula (I):

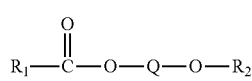
(I)

wherein Q represents the residue of a poly(trimethylene ether)glycol after abstraction of the hydroxyl groups, $R_2$ is H or $R_3CO$, and each of $R_1$ and $R_3$ is individually a substituted or unsubstituted aromatic, saturated aliphatic, unsaturated aliphatic or cycloaliphatic organic group, containing from 6 to 40 carbon atoms.

The esters are preferably prepared by polycondensation of hydroxyl groups-containing monomers (monomers containing 2 or more hydroxyl groups) predominantly comprising 1,3-propanediol to form a PO3G (as disclosed in further detail below), followed by esterification with a monocarboxylic acid (or equivalent)., as disclosed in U.S. application Ser. No. 11/593,954.

The PO3G ester thus prepared is a composition preferably comprising from about 50 to 100 wt %, more preferably from about 75 to 100 wt %, diester and from 0 to about 50 wt %, more preferably from 0 to about 25 wt %, monoester, based on the total weight of the esters. Preferably the mono- and diesters are esters of 2-ethylhexanoic acid.

The 1,3-propanediol employed for preparing the PO3G may be obtained by any of the various well known chemical routes or by biochemical transformation routes. Preferred routes are described in, for example, U.S. Pat. No. 7,098,368.

Preferably, the 1,3-propanediol is obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella, Citrobacter, Clostridium,* and *Lactobacillus*. The technique is disclosed in several publications, including U.S. Pat. No. 5,633,362, U.S. Pat. No. 5,686,276 and U.S. Pat. No. 5,821,092. U.S. Pat. No. 5,821,092 discloses, inter alia, a process for the biological production of 1,3-propanediol from glycerol using recombinant organisms.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol preferred for use in the context of the present invention contains only renewable carbon, and not fossil fuel-based or petroleum-based carbon. The PO3G and esters based thereon utilizing the biologically-derived 1,3-propanediol, therefore, have less impact on the environment as the 1,3-propanediol used in the compositions does not deplete diminishing fossil fuels and, upon degradation, releases carbon back to the atmosphere for use by plants once again. Thus, the compositions of the present invention can be characterized as more natural and having less environmental impact than similar compositions comprising petroleum based glycols.

The biologically-derived 1,3-propanediol, PO3G and PO3G esters, may be distinguished from similar compounds produced from a petrochemical source or from fossil fuel carbon by dual carbon-isotopic finger printing. This method usefully distinguishes chemically-identical materials, and apportions carbon in the copolymer by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship:

$$t=(-5730/0.693)\ln(A/A_0)$$

wherein t=age, 5730 years is the half-life of radiocarbon, and A and $A_0$ are the specific $^{14}C$ activity of the sample and of the modern standard, respectively (Hsieh, Y., *Soil Sci. Soc. Am J.*, 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2 \times 10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-Industrial Revolution wood. For the current living biosphere (plant material), $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding 6 $^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. −10 to −14 per mil ($C_4$) and −21 to −26 per mil ($C_3$) (Weber et al., *J. Agric. Food Chem.*, 45, 2942 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C \equiv \frac{(^{13}C/^{12}C)\text{sample} - (^{13}C/^{12}C)\text{standard}}{(^{13}C/^{12}C)\text{standard}} \times 1000\%$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their uniqueprofile and for the purposes of defining competition, for determining shelf life, and especially for assessing environmental impact.

Preferably the 1,3-propanediol used as the reactant to produce PO3G, or as a component of the reactant to produce PO3G, has a purity of greater than about 99%, and more preferably greater than about 99.9%, by weight as determined by gas chromatographic analysis. Particularly preferred are the purified 1,3-propanediols as disclosed in U.S. Pat. Nos. 7,038,092; 7,098,368; and 7,084,311; and US patent publication no. 2005/0069997A1, as well as PO3G made therefrom as disclosed in US patent publication no. 2005/0020805A1.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having CIELAB*a*b* "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The biobased, renewably sourced, content of the materials described herein can be determined by various methods. Particularly useful are ASTM D6852-02 and ASTM D6866. It is desirable for the materials described herein be at least 20% by weight renewably sourced.

PO3G preferred for use herein is typically polydisperse having a polydispersity (i.e. Mw/Mn) of preferably from about 1.0 to about 2.2, more preferably from about 1.2 to about 2.2, and still more preferably from about 1.5 to about 2.1.

The wellbore fluid composition preferably comprises the additives in an amount of less than 50 wt %, based on the total weight of the wellbore fluidcomposition. In various embodiments, the wellbore fluid can comprise the additives in an amount of about 25 wt % or less, or about 10 wt % or less, or about 5 wt % or less, based on the total weight of the wellbore fluid composition.

In preferred embodiments, the wellbore fluid is a substantially uniform mixture, with substantially no settling or phase separation of components.

Poly(trimethylene ether)Glycol/Water Gel

In one embodiment, the wellbore fluid is an aqueous gel comprising water and lower molecular weight poly(trimethylene ether)glycol, where the polytrimethylene glycol functions as the gelling agent, and is preferably the sole gelling agent. In this embodiment, the gel is preferably non-flowable at ambient temperature (e.g., at about 25° C. or below), and becomes a flowable liquid at a temperature of about 35° C. or higher and/or becomes a flowable liquid upon exposure to shear.

The gelation behavior of poly(trimethylene ether)glycol in this embodiment is sensitive to molecular weight, comonomer amount and water level. Depending on the polymer molecular weight and its concentration, when added to water and mixed it can form an emulsion or a homogenous solution. Preferably, the poly(trimethylene ether)glycol should have a molecular weight (Mn) of less than about 1000, and should have a comonomer content of less than about 10 mole %. Preferably, the poly(trimethylene ether)glycol is substantially a homopolymer of 1,3-propanediol.

These gel compositions are easily prepared by adding poly(trimethylene ether)glycol directly into water at ambient temperature. The order of addition, polymer to water or water to polymer, is not critical. No heating is required. The aqueous mixtures turn from a flowable fluid state to a non-flowable gel or creamy state within a few minutes. When the resulting gels are heated to a temperature above about 35° C., they return to their original flowable state but are able to gel again upon cooling. Thus, in use, the gels become a liquid upon shearing. As a result of this unique behavior of poly(trimethylene ether) glycol in water media, these lower molecular weight poly (trimethylene ether)glycols possess a unique combination of properties and can be used as a lubricants and wellbore fluids. This gelling behavior of the poly(trimethylene ether)glycol in aqueous systems is unusual in comparison, for example, to certain ethylene oxide and propylene oxide block copolymers show gelation behavior in water at high temperature but water-solubility at lower temperatures.

Emulsions

By "emulsion" is meant a stable mixture of two or more immiscible liquids held in suspension by small percentages of substances called emulsifiers, which may be nonionic, anionic, cationic or zwitterionic. The viscosity of emulsions depends on several factors, including the ratio of internal to external phase, type of oil phase, and presence or absence of thickening agents in the continuous phase.

Two phase emulsions, of the oil-in-water type and water-in-oil type, are useful in the subject invention. Triphase emulsion compositions, such as the water-in-oil-in-water type, as disclosed in U.S. Pat. No. 4,254,105, are also useful in the subject invention. Oils useful in both types of emulsions, and also for solvents in solvent-based vehicles in general, include hydrocarbon oils and waxes. In one embodiment, the wellbore fluid is a water-in-oil emulsion comprising poly(trimethylene ether)glycol, where the polytrimethylene glycol functions as the viscosifier, and is preferably the sole viscosifier. The amount of poly(trimethylene ether)glycol can be varied to obtain desired viscosity of the wellbore fluid. In some embodiments, the viscosity of a water-in-oil type wellbore fluid can be increased by adding to the wellbore fluid at least about 1 weight percent, based on the total weight of the wellbore fluid, of one or more poly(trimethylene ether)glycols, the glycols comprising one or members selected from the group consisting of: poly(trimethylene ether)glycol homopolymer, poly(trimethylene ether)glycol copolymers, and poly(trimethylene ether)glycol esters.

DEFINITIONS AND TEST METHODS

Unless otherwise specified, all chemicals and reagents used in the Examples below were used as received from Sigma-Aldrich Chemical Co., St. Louis, Mo. The renewable or biobased polymers used in the examples are derived from 1,-3-propanediol. The biobased content of the polymers can be determined according to the ASTM D6852-02 or ASTM D6866.

Aquatic toxicity was tested according to OECD TG 203 for acute/prolonged toxicity to fish, OECD TG 202 for acute toxicity to aquatic invertebrates, and OECD TG 201 for toxicity to aquatic plants. Biodegradability was tested according to the modified Zhan-Wellens/EMPA test as conducted according to the OECD 302B protocol.

EXAMPLES

Examples 1-3

Rheological Behavior

These examples demonstrate the rheological behavior of Cerenol™ H500 in water and in salt solution, respectively.

Several samples were prepared by adding 5.0 g of poly (trimethylene ether)glycol homopolymer having a number average molecular weight of 500 sample to a glass vial. A certain amount of water or water solution was added to the vial to make an aqueous solution with a desired concentration. The sample vials were shaken and placed still on a bench at room temperature (23° C.). The gel time was measured when there was no flow observed.

The data in the following Tables 1-3 indicates the homopolymer gels in pure water, in salt and in acidic and basic conditions at room temperatures.

Example 1

TABLE 1

Gelation in Water at Room Temperature

| Sample # | 1 | 2 | 3 | 4 | 5 | 6 | 7 | 8 | 9 | 10 | 11 |
|---|---|---|---|---|---|---|---|---|---|---|---|
| Water % | 17 | 23 | 33 | 41 | 50 | 60 | 67 | 71 | 75 | 77 | 79 |
| Gel Time (min.) | 320 | 60 | 40 | 40 | 40 | 40 | 30 | 30 | 30 | 30 | 40 |

Example 2

TABLE 2

Gelation in Water Solution of NaCl

| Sample # | 1 | 2 | 3 | 4 | 5 | 6 | 7 | 8 |
|---|---|---|---|---|---|---|---|---|
| Water % | 50 | 60 | 50 | 60 | 50 | 60 | 50 | 60 |
| NaCl % | 0.25 | 0.25 | 0.5 | 0.5 | 1.0 | 1.0 | 5.0 | 5.0 |
| Gel Time (min.) | 30 | 30 | 30 | 40 | 40 | 40 | 60 | 60 |

Example 3

TABLE 3

Gelation in water both at acidic and basic conditions

| Sample # | 1 | 2 | 3 | 4 | 5 | 6 | 7 | 8 |
|---|---|---|---|---|---|---|---|---|
| Water % | 50 | 60 | 50 | 60 | 50 | 60 | 50 | 60 |
| pH | 3 | 3 | 5 | 5 | Neutral (7) | Neutral (7) | 9 | 9 |
| Gel Time (min) | 60 | 60 | 60 | 60 | 40 | 40 | 30 | 50 |

Example 4

Water-in-Oil Emulsions

This example demonstrates the dramatic increase in viscosity of water-in-oil emulsions containing poly(trimethylene ether)glycol homopolymer having a number average molecular weigh of 2000. Four stable water-in-oil emulsions were prepared by maintaining the ratio of water to oil constant and by adding 0%, 0.5%, 2.0% and 5.0 wt % of homopolymer respectively. As the amount of homopolymer in the emulsion increases, the viscosity of the emulsion increases significantly as shown in Table 4.

TABLE 4

| % Homopolymer | Viscosity of water-in-oil emulsion (cP) |
|---|---|
| 0 | 1600 |
| 0.5 | 7600 |
| 2.0 | 64000 |
| 5.0 | 242000 |

Example 5

Heat Transfer Properties

This example demonstrates the heat transfer characteristics of poly(trimethylene ether)glycol homo and copolymers. The copolyether glycol was prepared from 1,3-propanediol and ethylene glycol and the copolyether glycol ester was prepared from 1,3-propanediol and 2-ethylhexanoic acid. The data are presented in Table 5.

TABLE 5

| Property | Homopolymer | Copolyether glycol | Copolyether glycol ester |
|---|---|---|---|
| Molecular weight | 500 | 1100 | 500 |
| Thermal conductivity, watts/m ° K | | | |
| @ 100° F. | 0.171 | 0.174 | 0.150 |
| @ 200° F. | 0.169 | 0.162 | 0.140 |
| Specific heat, cal/g ° C. | | | |
| @ 100° F. | 0.504 | 0.526 | |
| @ 200° F. | 0.570 | 0.571 | 0.544 |
| Coefficient of expansion, cc/cc/° C. at 40° C. | $5.82 \times 10^{-4}$ | $8.68 \times 10^{-4}$ | $8.2 \times 10^{-4}$ |

Example 6

Lubricity

This example demonstrates the lubricity characteristics of the copolyether glycol having a number average molecular weight of 1100 in the presence of additives. The results are shown in Table 6.

TABLE 6

| Property | Test Method | Copolyether glycol |
|---|---|---|
| Viscosity at 40° C., cSt | | 249 |
| Viscosity Index | | 216 |
| Coefficient of friction | ASTM D4172 | 0.033 |
| Four ball wear, mm | ASTM D4172 | 0.45 |
| Load wear Index | ASTM D2783 | 61.6 |
| Last non seizure load, kg | ASTM D2783 | 160 |
| Scar, mm | | 0.51 |
| Weld load, kg | | 200 |
| Falex pin & V block test Max load, lbs | ASTM D3233 | 3000 |

Example 7

This example demonstrates the foam characteristics of homopolymers having a number average molecular weight ranging from 500 to 2400.

7.5 g of homopolymer was added to 150 g of water, and the mixture was shaken 100 times. The height of the foam from the surface of the liquid was measured and reported in the Table below. The extent of foaming decreases with increase in molecular weight.

TABLE 7

| Homopolymer Mn | Foam height (mm) |
|---|---|
| 500 | 15 |
| 650 | 10 |
| 1120 | 6 |
| 1400 | 4 |
| 1900 | 0 |
| 2420 | 0 |
| 2840 | 0 |

Example 8

This example demonstrates the effect of defoaming agent on homopolymer (Mn=1400).

A 5% aqueous mixture was prepared by adding 0.75 g of homopolymer to 15 g water. The mixture was filtered to remove solids and then 500 part per millions of an antifoaming agent (0.008 g) XFO-317D (Ivanhoe Industries Inc, Mundelein, Ill.) was added. The mixture was shaken 100 times and no foam was observed.

Example 9

The aquatic toxicity test of poly(trimethylene ether)glycol homopolymer having molecular weight of 1400 was conducted and the results on the following species are reported below. As used herein, $LC_{50}$ means lethal concentration for 50 percent of the population tested. As used herein, $EC_{50}$ represents the molar concentration of an agonist, which produces 50% of the maximum possible response for that agonist.

The $LC_{50}$ (96 h) for *Oncorhynchus mykiss* (rainbow trout) was greater than 100 mg/L, based on testing via the OECD TG 203 protocol.

The EC50 (72 h) for *Pseudokirchneriella subcapitata* (green algae) was greater than 100 mg/L, based on testing via the OECD TG 201 protocol.

The EC50 (48 h) for *Daphnia magna* (water flea) was greater than 100 mg/L, based on testing via the OECD TG 202 protocol.

Example 10

The biodegradability by modified Zhan-Wellens/EMPA test was conducted according to the OECD 302B protocol on poly(trimethylene ether) glycol having number average molecular weight of 500. The polymer was biodegraded more than 90% after 28 days, as shown in table 8 below. A result of greater than 70% is evidence of "ultimate biodegradability".

TABLE 8

| Time (days) | % Biodegradation of Poly(trimethylene ether) glycol |
|---|---|
| 0.125 | 0 |
| 2 | 11 |
| 5 | 15 |
| 7 | 14 |
| 9 | 14 |
| 14 | 30 |
| 21 | 66 |
| 28 | 93 |
| 29 | 96 |

What is claimed is:

1. A method of preparing a wellbore fluid comprising adding to a base fluid: (a) one or more polymers having a number average molecular weight from about 250 to 5000, selected from the group consisting of poly(trimethylene ether)glycol homopolymer, and poly(trimethylene ether)glycol esters thereof; and (b) at least one additive selected from the group consisting of surfactants, fluid loss control additives, salts, and acid gas scavengers; wherein the amount of the base fluid in the wellbore fluid is at least about 50 weight percent based on the total weight of the wellbore fluid.

2. The method of claim 1 wherein the base fluid is an oil-in-water emulsion or a water-in-oil emulsion.

3. The method of claim 1 wherein the one or more polymers added to the base fluid is at least about 1 weight percent based on the total weight of the wellbore fluid.

4. The method of claim 1 wherein the viscosity of the wellbore fluid composition is within the range from about 1600 cP to about 250,000 cP.

5. The method of claim 1 wherein the one or more polymers have a coefficient of friction ranging from 0.03 to 0.09.

6. The method of claim 5 wherein the base fluid is oil-based.

7. The method of claim 1 wherein the one or more polymers have a thermal conductivity ranging from about 0.15 to about 0.2 watts/m ° K at 37 degrees Celsius.

8. The method of claim 7 wherein the base fluid is either an oil-in-water emulsion or a water-in-oil emulsion.

9. The method of claim 1 wherein the one or more polymers is renewably sourced, wherein the polymer has a number average molecular weight from 250 to 3000 and a renewable content of from 20 to 100% by weight.

10. The method of claim 1 wherein the polymer provides one or more function selected from the group consisting of: viscosity modification, lubrication, foaming, scale inhibition, and heat transfer.

11. A method of using an oil-in-water emulsion or a water-in-oil emulsion wellbore fluid in a subterranean formation comprising: providing a wellbore fluid comprising (a) a base fluid; (b) one or more polymers having a number average molecular weight from about 250 to 5000, selected from the group consisting of poly(trimethylene ether)glycol homopolymer, and poly(trimethylene ether)glycol esters thereof; and (c) at least one additive selected from the group consisting of surfactants, fluid loss control additives, salts, and acid gas scavengers; and drilling a well bore in the subterranean formation with the wellbore fluid.

* * * * *